United States Patent
Ho

(10) Patent No.: US 9,354,030 B2
(45) Date of Patent: May 31, 2016

(54) MEASURING TAPE WITH A SUCKER

(71) Applicant: Welltech Plastic Manufacturing Limited, Kowloon (HK)

(72) Inventor: Kar Ho Samuel Ho, Kowloon (HK)

(73) Assignee: WELLTECH PLASTIC MANUFACTURING LIMITED, Kwun Tong, Kowloon (HK)

( * ) Notice: Subject to any disclaimer, the term of this patent is extended or adjusted under 35 U.S.C. 154(b) by 67 days.

(21) Appl. No.: 14/501,076

(22) Filed: Sep. 30, 2014

(65) Prior Publication Data

US 2015/0107128 A1    Apr. 23, 2015

(51) Int. Cl.
*G01B 3/10* (2006.01)

(52) U.S. Cl.
CPC ...... *G01B 3/1041* (2013.01); *G01B 2003/1048* (2013.01)

(58) Field of Classification Search
CPC ............... G01B 3/1041; G01B 2003/1048; G01B 3/1071; G01B 2003/1074
USPC ............... 33/757, 758, 759, 760, 761, 768
See application file for complete search history.

(56) References Cited

U.S. PATENT DOCUMENTS

| | | | | |
|---|---|---|---|---|
| 2,711,030 A * | 6/1955 | Drew | ........ | G01B 3/1056 33/758 |
| 3,651,574 A * | 3/1972 | Burkart | ........ | G01B 3/1084 33/1 SB |
| 4,735,391 A * | 4/1988 | Lawrence | ........ | A47K 1/08 211/90.01 |
| 4,766,673 A * | 8/1988 | Bolson | ........ | G01B 3/00 33/760 |
| 4,924,597 A * | 5/1990 | Tursi | ........ | G01B 3/1071 33/758 |
| 5,253,421 A * | 10/1993 | Landmark | ........ | B43L 9/04 33/27.03 |
| 6,951,061 B1 * | 10/2005 | Rosetti | ........ | B43L 13/14 33/760 |
| 7,383,635 B1 * | 6/2008 | Stoneberg | ........ | B43L 7/005 33/27.03 |
| 2003/0167651 A1 * | 9/2003 | Pedersen | ........ | G01B 3/1071 33/758 |
| 2005/0268480 A1 * | 12/2005 | Potter | ........ | G01B 3/0156 33/768 |
| 2011/0138642 A1 * | 6/2011 | Norelli | ........ | G01C 9/28 33/371 |
| 2012/0042527 A1 * | 2/2012 | Olsen | ........ | G01C 15/12 33/228 |
| 2012/0073155 A1 * | 3/2012 | Mabey | ........ | G01B 3/1005 33/770 |
| 2013/0025147 A1 * | 1/2013 | Steele | ........ | G01B 3/1041 33/769 |
| 2013/0185949 A1 * | 7/2013 | Burch | ........ | G01B 3/1061 33/768 |
| 2014/0196299 A1 * | 7/2014 | Ouellette et al. | ........ | G01B 3/1084 33/701 |

* cited by examiner

*Primary Examiner* — G. Bradley Bennett

(57) ABSTRACT

A method of machining holes on a metal plate contains steps of: providing a metal plate and an auxiliary working sheet; contacting the auxiliary working sheet with a first face of a drilling area; drilling a hole on the auxiliary working sheet and the drilling area; and removing the auxiliary working sheet from the drilling area. The metal plate includes the drilling area, and the drilling area has the first face and a second face opposite to the first face, a hardness value of the auxiliary working sheet is 0.7 times more than the metal plate, and a rotating speed of a driller is more than 8,000 rpm/min, thereby machining the hole on the metal plate smoothly and uniformly.

9 Claims, 6 Drawing Sheets

100

MEASURING TAPE WITH A SUCKER

FIELD OF THE INVENTION

The present invention relates to a measuring tape with a sucker which is positioned on an object easily.

BACKGROUND OF THE INVENTION

A conventional measuring tape is employed to measure an object, but it cannot be fixed on the object easily, and a user cannot review measuring information by himself/shelf, when the object has a long length.

The present invention has arisen to mitigate and/or obviate the afore-described disadvantages.

SUMMARY OF THE INVENTION

The primary object of the present invention is to provide a measuring tape with a sucker in which a lower cover has a connecting device to position the measuring tape on an object to measure the object easily.

Another object of the present invention is to provide a measuring tape with a sucker by which a user can see measuring information conveniently and precisely by himself/shelf.

A measuring tape with a sucker provided by the present invention contains: a housing and a pulling tape disposed in the housing The housing includes an upper cover, a lower cover, and an outlet, the lower cover includes an accommodating cavity defined therein to accommodate a connecting device, the connecting device includes a rotating member and a sucker which are both rotatably mounted on the connecting device, the rotating member has a male fastener movably fixed thereon, and the sucker has a female fastener secured on a central position thereof, the accommodating cavity has at least one locking groove formed on an inner wall thereof, and the rotating member is retained in a plurality of recesses to rotate, the male fastener retains with the female fastener so that the sucker is connected with the rotating member, the sucker, the upper cover, and the lower cover are at a first plane, the pulling tape includes a scale face, and the sucker and the scale face of the pulling tape are on a second plane, the scale face faces to the upper cover.

DETAILED DESCRIPTION OF THE PREFERRED EMBODIMENTS

Figure 1:
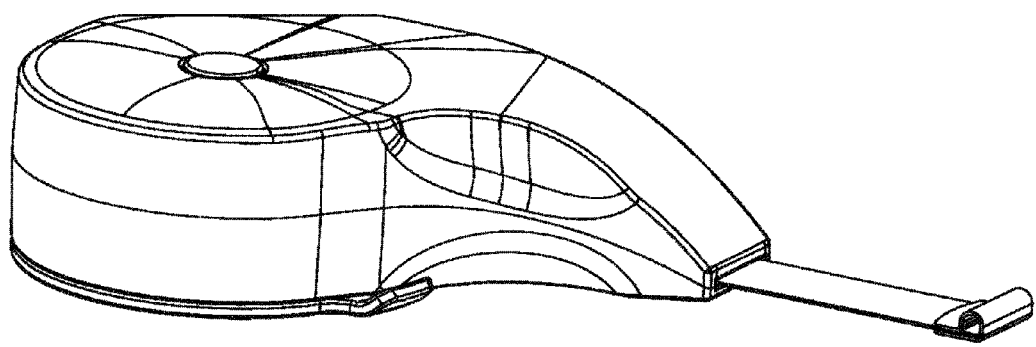
FIG. 1 is a perspective view showing the assembly of a measuring tape with a sucker according to a preferred embodiment of the present invention.
Figure 2:
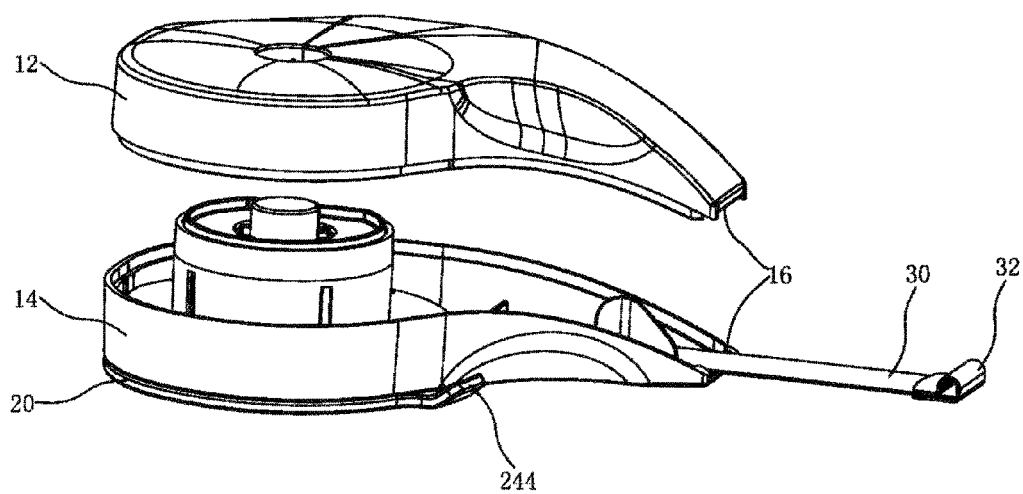
FIG. 2 is a perspective view showing the exploded components of the measuring tape with the sucker according to the preferred embodiment of the present invention.
Figure 3:
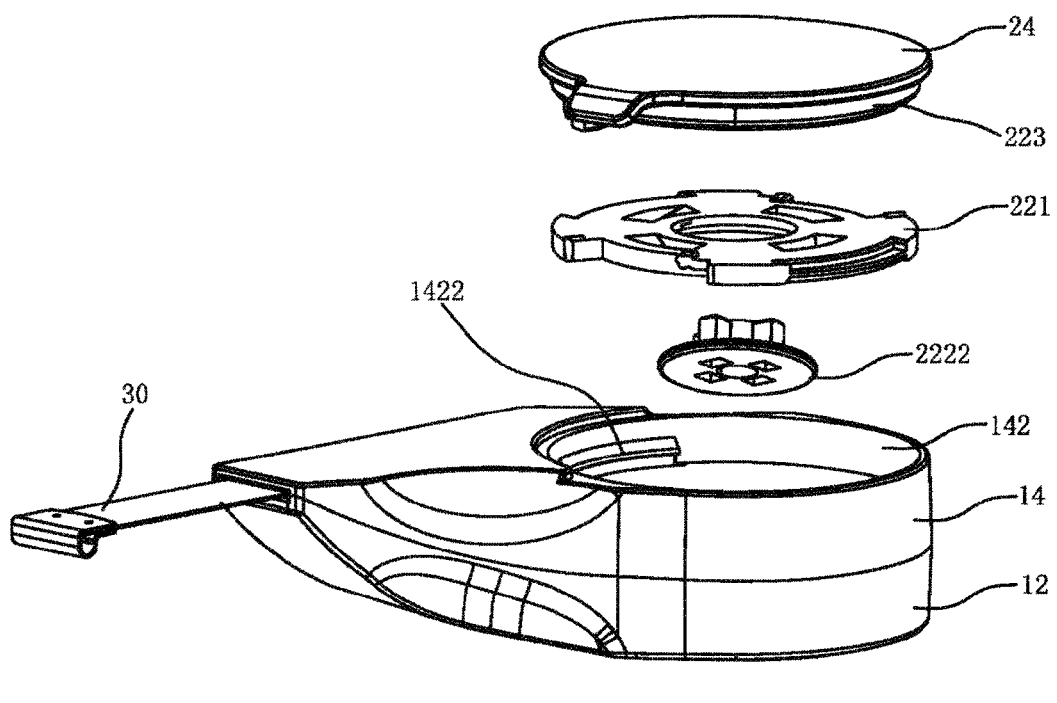
FIG. 3 is another perspective view showing the exploded components of the measuring tape with the sucker according to the preferred embodiment of the present invention.
Figure 4:
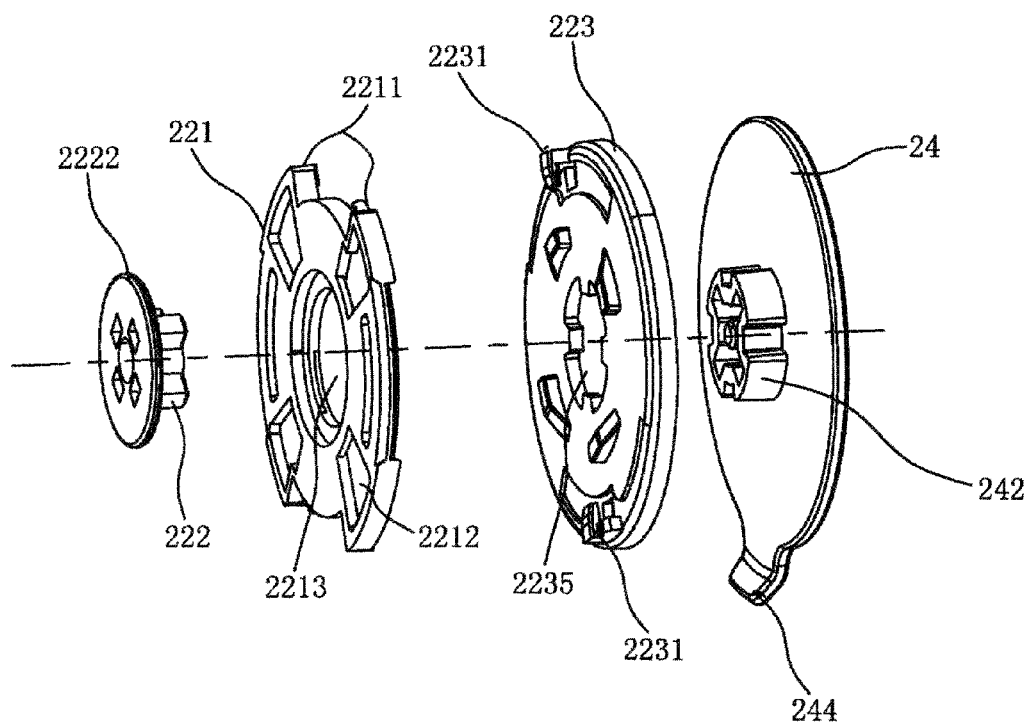
FIG. 4 is a perspective view showing the exploded components of a connecting member of the measuring tape with the sucker according to the preferred embodiment of the present invention.
Figure 5:
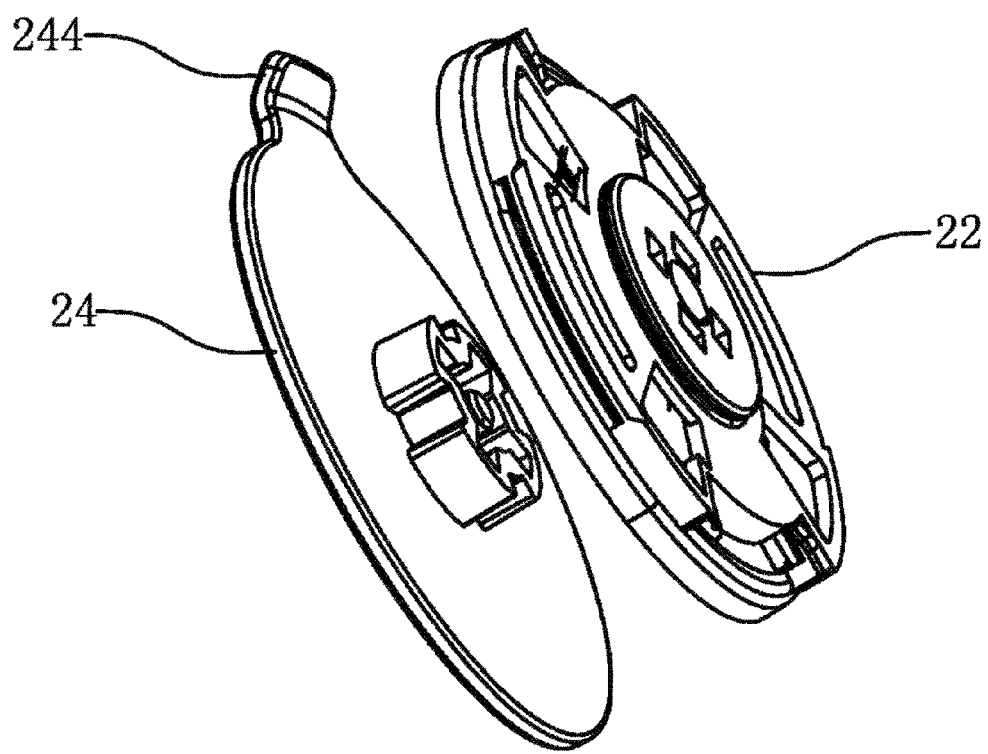
FIG. 5 is another perspective view showing the exploded components of the connecting member of the measuring tape with the sucker according to the preferred embodiment of the present invention.
Figure 6:
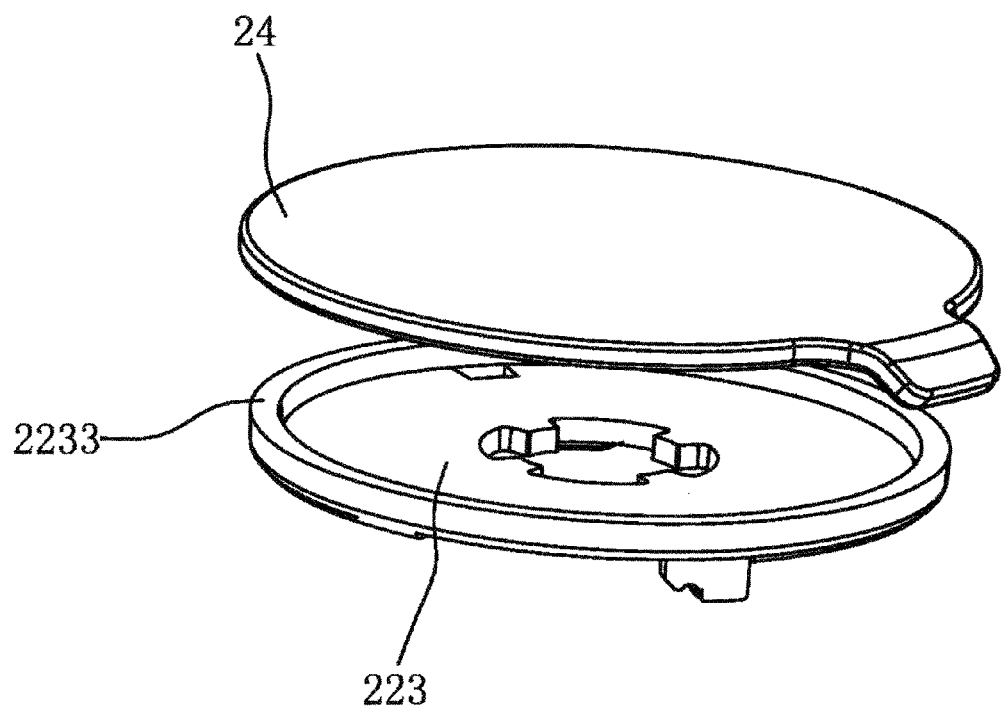
FIG. 6 is a perspective view showing the exploded components of a fixing disc and a sucker of the measuring tape with the sucker according to the preferred embodiment of the present invention.

With reference to FIGS. 1 to 3, a measuring tape 100 with a sucker according to a preferred embodiment of the present invention comprises: a housing and a pulling tape 30 disposed in the housing, and the housing includes an upper cover 12, a lower cover 14, and an outlet 16. The lower cover 14 includes an accommodating cavity 142 defined therein to accommodate a connecting device 20. The connecting device 20 includes a rotating member 22 and the sucker 24 which are both rotatably mounted on the connecting device 20. The rotating member 22 has a male fastener 222 movably fixed thereon, and the sucker 24 has a female fastener 242 secured on a central position thereof. The accommodating cavity 142 has at least one locking groove 1422 formed on an inner wall thereof, and the rotating member 22 is retained in a plurality of recesses 2212 to rotate, the male fastener 222 retains with the female fastener 242 so that the sucker 24 is connected with the rotating member 22. The sucker 24, the upper cover 12, and the lower cover 14 are at a first plane. The pulling tape 30 includes a scale face, and the sucker 24 and the scale face of the pulling tape 30 are on a second plane, wherein the scale face faces to the upper cover 12. The rotating member 22 rotates in the least one locking groove 1422, and the sucker 24 is fixed on the lower cover 14, such that the measuring tape 100 is positioned on an object easily so that a user measures the object by ways of the measuring tape 100.

As illustrated in FIGS. 3 to 6, the rotating member 22 also has a lock disc 221 and a fixing disc 223, and the lock disc 221 has a through hole 2213 defined on a central position thereof, the fixing disc 223 has an orifice 2235 formed on a central position thereof, wherein a profile of the orifice 2235 corresponds to a cross section of the male fastener 222. The male fastener 222 has a stop sheet 2222 radially extending from a first end thereof and corresponding to the through hole 2213, and a second end of the male fastener 222 retains with the female fastener 242 through the through hole 2213 and the orifice 2235, wherein when the male fastener 222 inserts through the through hole 2213, the stop sheet 2222 engages with the through hole 2213, and because the profile of the orifice 2235 corresponds to the cross section of the male fastener 222, the male fastener 222 engages with the orifice 2235, such that when the measuring tape 100 rotates, the male fastener 222 engages with the orifice 2235 to generate a rotating force, and the rotating force drives the fixing disc 223 to rotate. The lock disc 221 has at least one engaging tab 2211 arranged on a peripheral side thereof to engage with the least one locking groove 1422, such that the rotating member 22 is coupled with the lower cover 14. The lock disc 221 also has the plurality of recesses 2212 defined thereon, and the fixing disc 223 has plural protrusions 2231 disposed thereon to engage with the plurality of recesses 2212 so that the fixing disc 223 is joined with the lock disc 221. Preferably, the least one engaging tab 2211 is engaged with the least one locking groove 1422, and the plural protrusions 2231 are engaged with the plurality of recesses 2212, hence the lock disc 221 is joined with the fixing disc 223 securely.

The sucker 24 and the fixing disc 223 are circular, and a diameter of the sucker 24 is larger than that of the fixing disc 223; the fixing disc 223 also has a peripheral rib 2233 arranged around an outer side of a surface thereof to contact with the sucker 24, such that a gap is formed between the fixing disc 223 and the sucker 24, and the fixing disc 223 does not directly contact with the sucker 24 to lower a friction between the fixing disc 223 and the sucker 24, and when the measuring tape 100 rotates, it drives the sucker 24 to rotate.

The sucker 24 also has a limiting portion 244 extending upwardly from a peripheral side thereof, wherein the limiting portion 244 is an arcuate piece and extends upwardly to the upper cover 12, such that when the measuring tape 100 rotates to a certain range, it is stopped rotating by the limiting portion 244.

The sucker 24 is made of rubber or plastic, and the rubber is any one of NR, NBR, SI, FKM, PUR, NE, EPDM, and SE. The sucker 24 is formed in any one of a circular disc shape, a flat disc shape, an oval disc shape, and a ripple disc, wherein the ripple disc has single ripple pattern or plural ripple patterns.

The pulling tape 30 has a first end mounted in the housing, a second end inserted through the outlet 16, and a projection 32 fixed on the second end to pull the pulling tape easily.

A thickness of the sucker is 2.2 mm.

Thereby, the lower cover has the connecting device to position the measuring tape on the object to measure the object easily. The sucker is formed in the flat disc shape or the ripple disc shape to be applicable for various objects, such as a glass, a desktop, a stainless steel sheet, and a painted surface.

In operation, the pulling tape is pulled and is positioned on the various objects by user's one hand easily. The sucker, the upper cover, and the lower cover are on the first plane, and the sucker and the scale face of the pulling tape are on the second plane so that the sucker is attached on the object stably, hence the user can see measuring information conveniently and precisely.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A measuring tape with a sucker comprising:
a housing and a pulling tape disposed in the housing, characterized in that:
the housing includes an upper cover, a lower cover, and an outlet, the lower cover includes an accommodating cavity defined therein to accommodate a connecting device, the connecting device includes a rotating member and a sucker which are both rotatably mounted on the connecting device, the rotating member has a male fastener movably fixed thereon, and the sucker has a female fastener secured on a central position thereof, the accommodating cavity has at least one locking groove formed on an inner wall thereof, and the rotating member is retained in a plurality of recesses to rotate, the male fastener retains with the female fastener so that the sucker is connected with the rotating member, the sucker, the upper cover, and the lower cover are at a first plane, the pulling tape includes a scale face, and the sucker and the scale face of the pulling tape are on a second plane, the scale face faces to the upper cover.

2. The measuring tape with the sucker as claimed in claim 1, characterized in that the rotating member also has a lock disc and a fixing disc, and the lock disc has a through hole defined on a central position thereof, the fixing disc has an orifice formed on a central position thereof, wherein a profile of the orifice corresponds to a cross section of the male fastener, the male fastener has a stop sheet radially extending from a first end thereof and corresponding to the through hole, and a second end of the male fastener retains with the female fastener through the through hole and the orifice.

3. The measuring tape with the sucker as claimed in claim 2, characterized in that the lock disc has at least one engaging tab arranged on a peripheral side thereof to engage with the least one locking groove, such that the rotating member is coupled with the lower cover.

4. The measuring tape with the sucker as claimed in claim 2, characterized in that the lock disc also has the plurality of recesses defined thereon, and the fixing disc has plural protrusions disposed thereon to engage with the plurality of recesses so that the fixing disc is joined with the lock disc.

5. The measuring tape with the sucker as claimed in claim 2, characterized in that the sucker and the fixing disc are circular, and a diameter of the sucker is larger than that of the fixing disc.

6. The measuring tape with the sucker as claimed in claim 5, characterized in that the fixing disc also has a peripheral rib arranged around an outer side of a surface thereof to contact with the sucker, such that a gap is formed between the fixing disc and the sucker.

7. The measuring tape with the sucker as claimed in claim 1, characterized in that the sucker also has a limiting portion extending upwardly from a peripheral side thereof, and the limiting portion is an arcuate piece and extends upwardly to the upper cover.

8. The measuring tape with the sucker as claimed in claim 1, characterized in that the pulling tape has a first end mounted in the housing, a second end inserted through the outlet, and a projection fixed on the second end to pull the pulling tape easily.

9. The measuring tape with the sucker as claimed in claim 1, characterized in that a thickness of the sucker is 2.2 mm.

* * * * *